United States Patent
Ohno et al.

(10) Patent No.: US 7,495,863 B2
(45) Date of Patent: Feb. 24, 2009

(54) HYDRODYNAMIC BEARING DEVICE, AND SPINDLE MOTOR AND INFORMATION DEVICE USING THE SAME

(75) Inventors: Hideaki Ohno, Sennan (JP); Katsushi Hirata, Ozu (JP); Takanori Shiraishi, Ozu (JP)

(73) Assignee: Panasonic Corporation, Osaka (JP)

( * ) Notice: Subject to any disclaimer, the term of this patent is extended or adjusted under 35 U.S.C. 154(b) by 305 days.

(21) Appl. No.: 11/236,827

(22) Filed: Sep. 28, 2005

(65) Prior Publication Data

US 2006/0072243 A1     Apr. 6, 2006

(30) Foreign Application Priority Data

Oct. 1, 2004     (JP)     ............... 2004-290236

(51) Int. Cl.
G11B 17/02 (2006.01)
F16C 33/10 (2006.01)
F16C 32/06 (2006.01)

(52) U.S. Cl. .................... 360/99.08; 384/100
(58) Field of Classification Search ................ 384/100, 384/107, 112, 114, 123; 508/221, 283; 360/98.07, 360/99.04, 99.08
See application file for complete search history.

(56) References Cited

U.S. PATENT DOCUMENTS

| | | | |
|---|---|---|---|
| 4,705,641 A * | 11/1987 | Goldblatt et al. ............ | 508/537 |
| 6,531,273 B1 | 3/2003 | Olson et al. | |
| 2003/0109767 A1 | 6/2003 | Vasina et al. | |
| 2004/0179758 A1 * | 9/2004 | Ohno .......................... | 384/100 |
| 2005/0088779 A1 | 4/2005 | Gomyo et al. | |
| 2005/0113621 A1 * | 5/2005 | Hope et al. ................. | 585/521 |

FOREIGN PATENT DOCUMENTS

| | | | |
|---|---|---|---|
| EP | 791643 A1 * | 8/1997 | |
| JP | 2000-336383 | 12/2000 | |
| JP | 2001-316687 | 11/2001 | |
| JP | 2002-187863 | 7/2002 | |
| JP | 2002-195252 | 7/2002 | |
| JP | 2002-265394 | 9/2002 | |
| JP | 2004043719 A * | 2/2004 | |
| WO | WO 2007010845 A1 * | 1/2007 | |
| WO | WO 2007055324 A1 * | 5/2007 | |

OTHER PUBLICATIONS

Hiroyuki Ohno, "Ionic Liquid II—Marvelous Developments and Colorful Near Future", CMC Publishing Co., Ltd., 2006.

* cited by examiner

*Primary Examiner*—William J Klimowicz
(74) *Attorney, Agent, or Firm*—Wenderoth, Lind & Ponack, L.L.P.

(57) ABSTRACT

A hydrodynamic bearing device has high reliability and is suitable for miniaturization through superior heat resistance and by utilizing a dynamic pressure-generating liquid with little loss due to evaporation. The hydrodynamic bearing device has at least one of a shaft structure and a sleeve having a dynamic pressure-generating mechanism. The dynamic pressure-generating liquid present in a gap between the shaft structure and the sleeve has a main component that is ionic liquid.

3 Claims, 2 Drawing Sheets

HYDRODYNAMIC BEARING DEVICE, AND SPINDLE MOTOR AND INFORMATION DEVICE USING THE SAME

BACKGROUND OF THE INVENTION

1. Field of the Invention

The present invention relates to a dynamic pressure-type hydrodynamic bearing device, as well as a spindle motor and information device using the same.

2. Description of the Prior Art

A hydrodynamic bearing device comprises a shaft and a sleeve that supports the shaft, and a dynamic pressure-generating liquid that is interposed in the gap between the two parts. With rotation of the shaft, the dynamic pressure-generating liquid is gathered up by dynamic pressure-generating grooves that are formed on the shaft or sleeve, and generates pressure such that the shaft is supported within the sleeve without coming into contact therewith. As a result, high-speed rotation can be attained, and ambient noise during the rotation can be alleviated.

A spindle motor equipped with such a hydrodynamic bearing device can provide the requisite rotational accuracy with an increased recording density of the medium, and can furthermore provide excellent shock resistance and quietness. Thus, it can be used in a majority of motors for application in such representative magnetic disk devices as information technology equipment and audio-visual equipment.

In recent years, magnetic disk devices have become progressively miniaturized and have enhanced speed, and there is also a demand for the spindle motor, which is the main component, to be miniaturized and enhanced in speed.

In a conventional hydrodynamic bearing, air and liquid such as lubricating oil and the like have been used as the fluid for generating dynamic pressure in the gap between the shaft and the sleeve. However, the viscosity of air is low and requires extremely thin gaps and broad facing surfaces in order to generate pressure in the gap, and to achieve this requires highly precise machining. The cost of manufacturing increases as a result. Moreover, if liquid such as lubricating oil (referred to below as "dynamic pressure-generating liquid") is used, in order to achieve the ideal low viscosity liquid that will reduce the torque (turning force) of a hydrodynamic bearing device, in other words to reduce the consumption electric power, it is necessary to reduce the vaporization loss that accompanies heat generation during continuous use.

Conventionally, hydrodynamic bearing devices have been proposed that use esters such as dioctyl sebacate (DOS), dioctyl azelate (DOZ), and dioctyl adipate (DOA) as dynamic pressure-generating liquid. Hydrodynamic bearing devices that use a mixture of neopentyl glycol esters of caprylic acid and capric acid (see for example Japanese published unexamined application No. 2000-336383), hydrodynamic bearing devices that use esters obtained from neopentyl glycol and C-6 to C-12 monovalent fatty acids and/or their derivatives as dynamic pressure-generating liquid (see for example Japanese published unexamined application No. 2001-316687), and hydrodynamic bearing devices that use polyol esters derived from diol components that have alkyl side chains at the β- or β,β'-positions (see for example Japanese published unexamined application No. 2002-195252) have been proposed.

However, while these conventional dynamic pressure-generating liquids of the hydrocarbon series have low viscosity and can reduce torque, their heat resistance is lower (higher vapor pressure) due to the characteristics of their molecular structure, and the amount of evaporation produced will increase as they reach a high temperature. For this reason, if used continuously in a high temperature environment, the amount of dynamic pressure-generating liquid required for the rotation of the bearing cannot be maintained.

For the amount of evaporation of the dynamic pressure-generating liquid considered previously, the above requirement makes it necessary to fill with an excess of the dynamic pressure-generating liquid, but the space and location required in order to fill with an excess of the dynamic pressure-generating liquid result in the miniaturization of the hydrodynamic bearing device and reductions in the cost becoming difficult.

SUMMARY OF THE INVENTION

The present invention provides a hydrodynamic bearing device, comprising at least one of a shaft and a sleeve having a dynamic pressure-generating mechanism, and a dynamic pressure-generating liquid present in a gap between the shaft and the sleeve, wherein the main component of the dynamic pressure-generating liquid is ionic liquid.

Furthermore, the present invention provides a spindle motor equipped with the hydrodynamic bearing device and an information device equipped with the spindle motor.

The present invention has the objective of providing a hydrodynamic bearing device, spindle motor and information device with a long operational lifetime that is suitable for miniaturization, that has high reliability and high performance through superior heat resistance (specifically, even in a high temperature environment) and by utilizing a dynamic pressure-generating liquid with little loss due to evaporation.

Also, the present invention has the objective of providing a hydrodynamic bearing device that reduces the amount of the dynamic pressure-generating liquid to be filled in each device due to a reduction in the amount of evaporation of the dynamic pressure-generating liquid, as well as eliminates the need for the location and space for filling an excess of the dynamic pressure-generating liquid, so that the cost can be lowered and the device is suitable for miniaturization.

BRIEF DESCRIPTION OF THE DRAWINGS

Referring now to the attached drawings which form a part of this original disclosure.

DETAILED DESCRIPTION

Embodiments of the present invention are shown in detail below, and are described with reference to the drawings.

Embodiment 1

Figure 2:
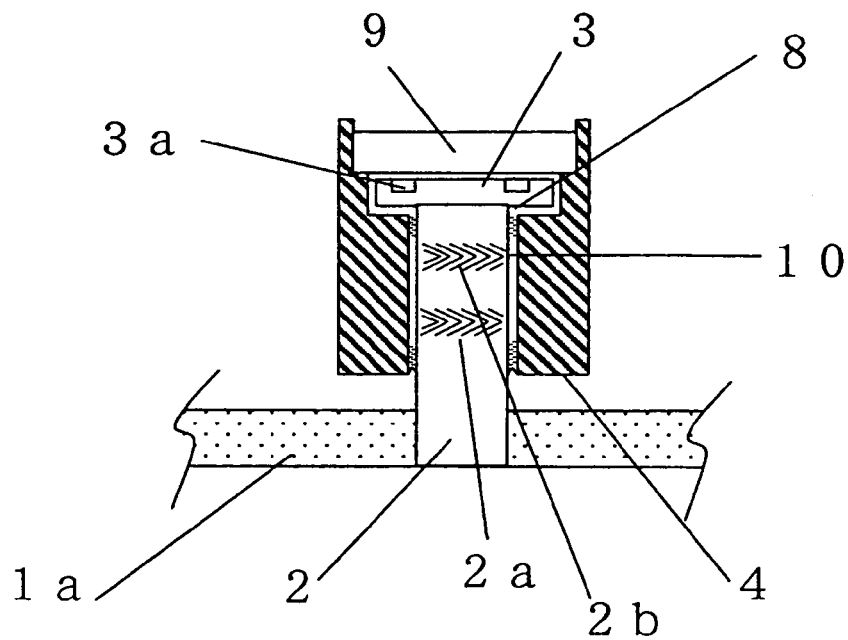
FIG. 2 is a cross section drawing of a hydrodynamic bearing device in a fixed shaft type of Embodiment 1 of the present invention.

Embodiment 1 of the present invention is described with reference to FIG. 2. FIG. 2 is a cross section drawing of the main component for a hydrodynamic bearing device in a fixed shaft type of Embodiment 1.

In FIG. 2, radial dynamic pressure-generating grooves $2a$ and $2b$ are formed in a herringbone pattern on the outer circumferential surface of shaft 2. One end of the shaft 2 is affixed to thrust flange 3, and the other end is press fitted into base 1*a*. Shaft 2 and thrust flange 3 form the shaft component. The shaft component and the base 1*a* constitute the fixed component.

On the one hand, sleeve 4 possesses a bearing bore that supports the shaft component. Thrust plate 9 is mounted on one end of sleeve 4. The shaft component is inserted into the bearing bore of sleeve 4 in such a manner as to face thrust plate 9 and thrust flange 3. Sleeve 4 and thrust plate 9 constitute the rotator. Thrust dynamic pressure-generating groove 3*a* is formed in a spiral pattern on the surface of thrust flange 3 opposite to thrust plate 9. The ionic liquid described below as the dynamic pressure-generating liquid 8 is filled into the gap between the bearing bore and the shaft component. The rotator and the fixed component constitute the motor drive component.

With the rotation of rotator, dynamic pressure-generating grooves 2*a* and 2*b* gather up dynamic pressure-generating liquid 8, and pumping pressure is generated in the radial direction at the radial gap between shaft 2 and sleeve 4. Likewise, with the rotation, dynamic pressure-generating grooves 3*a* gathers up dynamic pressure-generating liquid 8, and pumping pressure is generated in the thrust direction between thrust flange 3 and thrust plate 9. As a result, the rotator is buoyed upwards with respect to the fixed portion and is rotatably supported without contact.

Furthermore, rotational speeds of 4,200, 5,400, 7,200, 10,000, or 15,000 rpm are generally used for the motor.

For the material of shaft 2, stainless steel is the most suitable. In comparison with other metals, stainless steel is advantageous because it has high hardness, and the formation of wear particles can be suppressed. More preferable is martensite stainless steel.

For sleeve 4, the use of a material such as copper alloy, iron alloy, stainless steel, ceramic, or resin is preferred. In addition, a material such as copper alloy, iron alloy or stainless steel that is more wear resistant and has higher workability, as well having a lower cost, is further preferred. Moreover, sintered materials are also satisfactory from the cost perspective, and the same effect can be obtained when the dynamic pressure-generating liquid is impregnated into a sintered material. All or part of the surface of the shaft material and/or the sleeve material can be subjected to a surface modification treatment such as plating, physical vapor deposition, chemical vapor deposition, or diffusion coating.

Furthermore, as mentioned in the explanation above, radial dynamic pressure-generating grooves are formed on the outer circumferential surface of shaft 2, but they can also be formed on the bearing bore surface of sleeve 4 (inner circumferential surface), as well as on both the outer circumferential surface of shaft 2 and the bearing bore surface of sleeve 4. In other words, at least one of the shaft and the sleeve can possess radial dynamic pressure-generating mechanical features. Also, between the side face of thrust flange 3 and the sleeve can possess radial dynamic pressure-generating mechanical features. Examples of dynamic pressure-generating mechanical features that can be mentioned include various types of shapes such as grooves, projections, bumps, and inclined planes. Moreover, for the radial dynamic pressure-generating grooves, various configurations such as a herringbone pattern and a spiral pattern can be employed.

In addition, thrust dynamic pressure-generating grooves can be formed either only on the face of thrust flange 3 opposite to thrust plate 9, or only on the face of thrust plate 9 opposite to thrust flange 3, or only the reverse side of the face of thrust flange 3 opposite to thrust plate 9, as well as on two or more of these three locations. Furthermore, for any dynamic pressure-generating mechanical features similar to those mentioned above in addition to thrust dynamic pressure-generating grooves, any type of mechanical feature will be satisfactory.

One end of the shaft component is fixed in the Embodiments, although the present invention is not limited to this configuration, and the same effect can be obtained with both ends being fixed or with both ends of the bearing bore of the sleeve being open.

Embodiment 2

Figure 1:
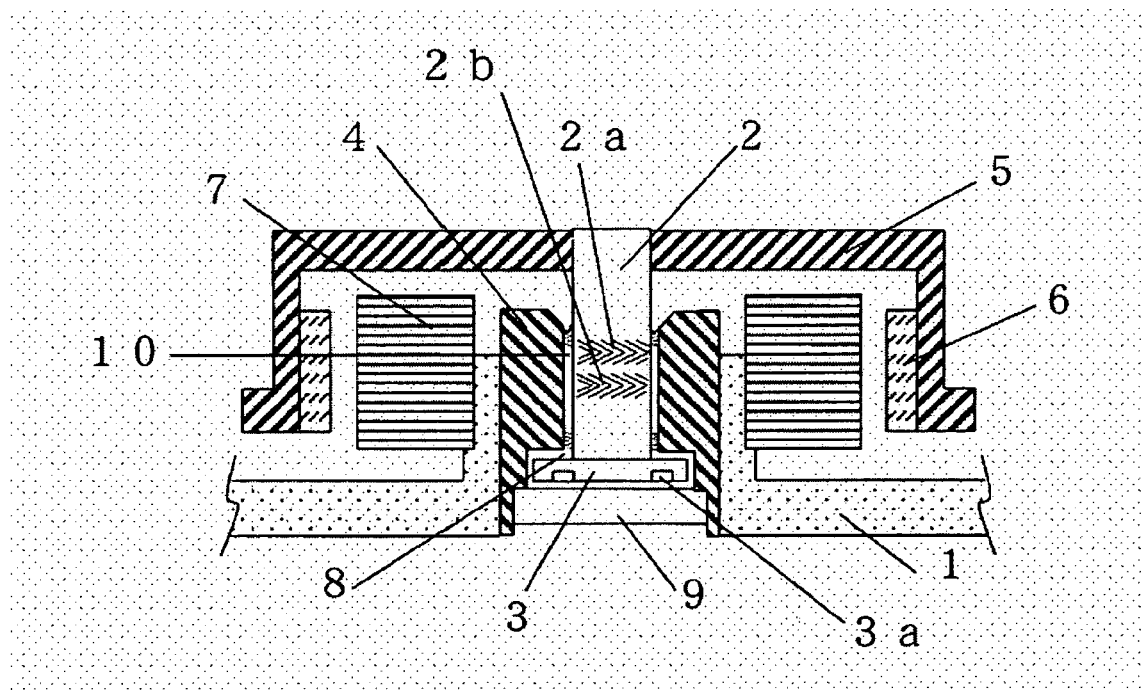
FIG. 1 is a cross section drawing of a magnetic disk device and a spindle motor that has the rotating shaft-type hydrodynamic bearing device in Embodiment 2 of the present invention.

Embodiment 2 of the present invention is explained by using FIG. 1. FIG. 1 is a cross section drawing of the main component of a magnetic disk device equipped with a spindle motor that possesses a rotating shaft-type hydrodynamic bearing device of Embodiment 2. The hydrodynamic bearing device in this Embodiment differs from the hydrodynamic bearing device in Embodiment 1 in FIG. 2 in the point that the present Embodiment has a rotating shaft type while Embodiment 1 has a fixed shaft type, and has the thrust dynamic pressure-generating grooves such as a herringbone pattern. With the exception of this point, Embodiment 2 is identical to Embodiment 1, and any of the elements having identical symbols have been omitted from the explanation.

In FIG. 1, radial dynamic pressure-generating grooves 2*a* and 2*b* are formed in a herringbone pattern on the outer circumferential surface of shaft 2, and the one end of shaft is affixed to thrust flange 3, and the other end is press fitted into hub 5. Shaft 2 and thrust flange 3 form the shaft component.

Rotor magnet 6 is affixed to the inner circumferential surface of hub 5. The shaft component (shaft 2 and thrust flange 3), hub 5 and rotor magnet 6 constitute the rotator. In the present invention, only the shaft 2 may constitute a shaft structure, and optionally, a part (FIG. 3) or all of the thrust flange 3 (FIG. 1 and FIG. 2) and the hub 5 may constitute the shaft structure.

On the other hand, sleeve 4, which is pressure fitted into base 1, possesses a bearing bore that bears the shaft component. Thrust plate 9 is mounted on one end of sleeve 4. The shaft component is inserted into the bearing bore of sleeve 4 in such a manner as to face thrust plate 9 and thrust flange 3. Stator coil 7 is mounted on a wall formed by base 1. Base 1, sleeve 4, thrust plate 9, and stator coil 7 form the fixed component. Thrust dynamic pressure-generating groove 3*a* is formed in a herringbone pattern on the surface of thrust flange 3 opposite to thrust plate 9. The bearing device is constituted when dynamic pressure-generating liquid 8 is filled into the gap between the bearing bore and the shaft component. The rotator and the fixed component constitute the motor drive component.

The rotational driving action of the rotator due to this motor drive component will be explained.

First, stator coil 7 is energized to produce a rotating magnetic field, and rotor magnet 6 that is mounted to face stator coil 7 will experience rotational force, so that hub 5, shaft 2 and thrust flange 3 all begin to rotate together. Due to this rotation, herringbone-shaped dynamic pressure-generating grooves 2*a*, 2*b* and 3*a* gather up dynamic pressure-generating liquid 8, and pumping pressure is generated in the radial direction and in the thrust direction (between shaft 2 and sleeve 4, and between thrust flange 3 and thrust plate 9). As a result, the rotator is buoyed upwards with respect to the fixed portion and is rotatably supported without contact, so that recording and playback of data on a magnetic disk is possible.

There is no limitation to the material of magnetic disk mounted on hub 5, but glass or aluminum is preferred. There are no limitations in the case of small-scale models, but one or more plates (usually 1 to 2 plates) can be attached. Among these, magnetic disk devices and spindle motors equipped with small-scale magnetic disks ≦2.5 inches in size are effective for the present invention.

Embodiment 3

Figure 3:
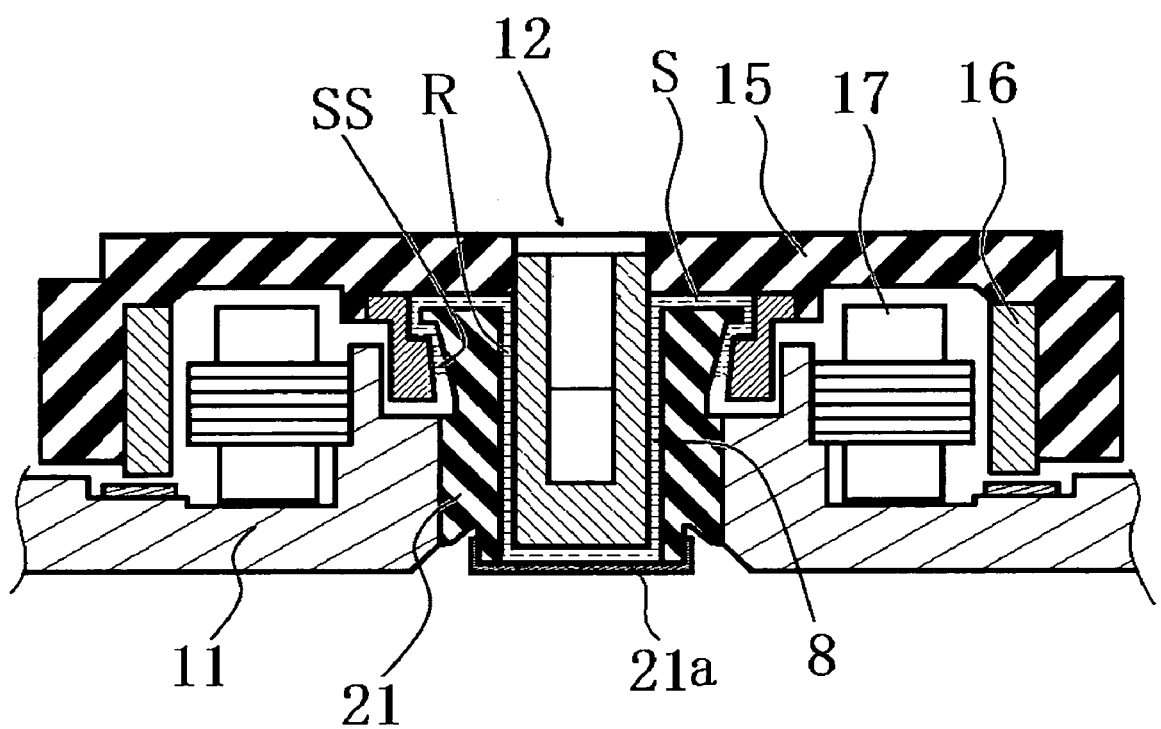
FIG. 3 is a cross section drawing of a hydrodynamic bearing device of Embodiment 3 of the present invention.

FIG. 3 is a cross section drawing of the main component of a magnetic disk device equipped with a spindle motor that possesses a rotating shaft-type hydrodynamic bearing device.

In this magnetic disk device, a sleeve 21, pressure fitted into the center of base 11, possesses a bearing bore that bears the shaft 12. Stator coil 17 is mounted on a wall formed by the base 11. The shaft 12 is inserted into the bearing bore of sleeve 21 from one end and the other end of the bearing bore is closed over by a cap 21a. Radial dynamic pressure-generating grooves (not shown) are formed in a herringbone pattern on the outer circumferential surface of shaft 12. The one end of shaft 12 is press fitted into hub 15 and the other end of shaft 12 is opposed to the cap 21a. The outer circumferential surface of the shaft 12 (a dynamic-pressure surface) radially opposes the inner circumferential surface of the sleeve 21 (a dynamic-pressure surface). They have a gap R interposed therebetween, and the gap R is filled with a dynamic pressure-generating liquid 8. A rotor magnet 16 is affixed to the inner circumferential surface of hub 15. Shaft 12 and hub 15 form a shaft structure.

The upper end face of the sleeve 21 (a dynamic-pressure surface) and the undersurface of the hub 15 (a dynamic-pressure surface) are disposed so as to axially oppose each other with a gap S interposed therebetween. Thrust dynamic-pressure-generating grooves in a spiral pattern are formed in at least one of either of dynamic-pressure surfaces of the sleeve 21 or hub 15 (not shown in FIG. 3). This gap S is filled with the dynamic pressure-generating liquid 8. From the gap R to the gap S, this liquid 8 is charged in an essentially continuous manner and without interruption.

When the shaft 12 and the hub 15 rotate, dynamic pressure generates within the dynamic pressure-generating liquid 8 by the action of the thrust dynamic pressure generating grooves described above. Due to the dynamic pressure, shaft 12 and hub 15 are buoyed upwards with respect to the thrust direction and are rotatably supported without contact.

A seal section SS having a gap is provided on the outer circumferential surface of the sleeve 21. The gap in which the seal section SS is formed connects with the gap S at the diametrically outer side of sleeve 21 and is configured to expand heading downward. Thus, the seal section SS prevents external outflow of the dynamic pressure-generating liquid 8.

Dynamic pressure-generating liquid 8 contains an ionic liquid as the main component.

Ionic liquids, also referred to as molten salts or fused salts, are generally salts formed from positive ions and negative ions that are in the liquid state at ordinary temperatures (for example, room temperature, from about 20° C. to about 23° C.), in which the ionic bonds between the positive ions and negative ions are sufficient to keep them strongly bound together. Ionic liquids are not necessarily constituted from only one type each of positive ion and negative ion, but can also comprise a combination of two or more types.

Examples of positive ions include at least one selected from the group consisting of imidazolium salts, pyridinium salts, ammonium salts (for example, alicyclic compounds (pyperidinium salts), aliphatic compounds and the like), phosphonium salts, and examples of negative ions include at least one selected from the group consisting of halides, nitrates, sulfur containing groups, fatty acids, cyano groups, perfluoro groups.

Examples of combination include a combination of imidazolium salts and sulfur containing groups, a combination of imidazolium salts and cyano groups, a combination of imidazolium salts and perfluoro groups, a combination of pyridinium salts and sulfur containing groups, a combination of pyridinium salts and cyano groups, a combination of pyridinium salts and perfluoro groups, a combination of ammonium salts and sulfur containing groups, a combination of ammonium salts and cyano groups, a combination of ammonium salts and perfluoro groups.

Examples of ionic liquids include the following.

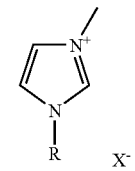
(1)

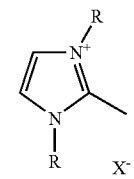
(2)

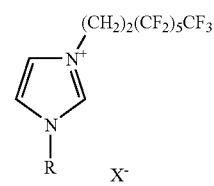
(3)

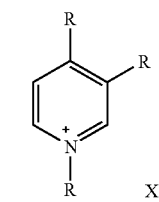
(4)

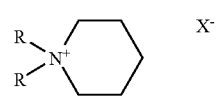
(5)

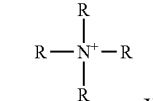
(6)

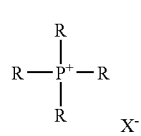
(7)

wherein, R represents a hydrogen atom or any C1-C14 alkyl (methyl, ethyl, propyl, iso-butyl, n-butyl, pentyl, tetradecyl and the like), and when there is more than one R in the molecular formula, each R has an identical structure, or the structures of some or all R are different. X represents inorganic ions such as Cl, Br, $BF_4$, $PF_6$, $NO_3$ and halide; and organic ions such as HSCN, $CF_3SO_3$, $CF_3(CF_2)_3SO_3$, $CF_3(CF_2)_7SO_3$, $(CF_3SO_2)_2N$, $(C_2F_5SO_2)_2N$, p-$CH_3C_6H_4SO_2$, $CH_3SO_3$, $C_8H_{17}OSO_3$, $CH_3OSO_3$, $CH_3O(C_2H_4O)_2SO_3$, $[(CH_3)_3CCH_2CH(CH_3)CH_2]_2P(O)O$, $CH_3(CH_2)_8CO_2$, $N(CN)_2$ and the like.

It is preferable at least for the working temperatures of the ionic liquids to be those at which they are liquid. Working temperatures are those temperatures at which the hydrodynamic bearing device is assembled or at which the hydrodynamic bearing device will be used in practice.

Ionic liquids have superior non-volatility and heat resistance, there is little vaporization loss even when used in a high-temperature environment, and they can maintain the amount of dynamic pressure-generating liquid required for the rotation of the shaft even when used for long periods of time.

Ionic liquids with a melting point ≦0° C. are preferred. If a hydrodynamic bearing device is used in a low-temperature environment and the melting point or freezing point of the ionic liquid is near to room temperature, the torque on the shaft will increase markedly, and there is also a high probability that the shaft will lock, so that adequate reliability will not be obtained. However, an ionic liquid in a hydrodynamic bearing device of the present invention will have a low melting point, so that no malfunction will occur in a low-temperature environment, and the usable temperature range will be broad. In particular, a melting point of from about 0° C. to about −60° C. is further preferred. Alternatively, from another viewpoint, a pour point of 15° C. or less, 0° C. or less is preferable, and furthermore −10° C. or less is more preferred. The pour point is the value measured according to the JIS K2269.

An ionic liquid with a high viscosity index is preferred. The viscosity index expresses the temperature dependence of the viscosity of an ionic liquid, for example the value calculated according to the JIS K2283. A viscosity index of 150 or higher is preferable, and a value of 170 or higher, 180 or higher, 200 or higher, 220 or higher is more preferable, and furthermore 250 or higher is still more preferable. When the viscosity index becomes higher, the difference in viscosity between low temperatures and high temperatures becomes smaller, and consequently rigidity can be maintained at high temperatures, while a reduction in electric current at low temperatures can be achieved. Moreover, by using ionic liquids with a high viscosity index, since the difference in viscosity between low temperatures and high temperatures can be kept to a minimum, it is easy to use even a stainless steel shaft, for example, in combination with a copper-type sleeve (the linear expansion of which varies by a factor of about 2 from stainless steel). For this reason, the machining accuracy for the sleeve can be increased by free-cutting the copper stock, and the operational lifetime of the cutting tool will be longer.

Moreover, it is preferable for the ionic liquid to have a low kinematic viscosity at 40° C. For example, 50 mm²/s or less, 45 mm²/s or less, 40 mm²/s or less, 25 mm²/s or less, 23 mm²/s or less, or 21 mm²/s or less is preferable, and moreover 18 mm²/s or less is more preferable, and 5 mm²/s or greater is furthermore preferable. In addition, the value for the kinematic viscosity is calculated according to the JIS K2283.

An ionic liquid with a high surface tension is preferred. For example, 32 mN/m or greater, 35 mN/m or greater, 40 mN/m or greater, 45 mN/m or greater, or 50 mN/m or greater is preferable, and 55 mN/m or greater is further preferable. As a result, adequate sealing efficacy can be exhibited even when the motor is designed with a large taper seal angle, and since the liquid surface of the ionic liquid can be seen readily, it becomes possible to manage the liquid surface easily. Moreover, if the labyrinth structure is either omitted or is made smaller, a simplification can be achieved. Furthermore, the value measured at 20° C. for the surface tension mentioned here is determined according to the JIS K2241.

Moreover, it is preferable for the ionic liquid to have a low rate of volumetric change and/or coefficient of linear expansion and/or coefficient of volume expansion, and a low amount of evaporation is preferred. Furthermore, the value for the mean coefficient of volume expansion can be calculated according to the formula given below:

$$\alpha_m = \frac{1}{v_0} \frac{(v_2 - v_1)}{(t_2 - t_1)}$$

(In the equation, $\alpha_m$ is the mean coefficient of volume expansion (1/K), $t_1$ and $t_2$ are temperature 1 and temperature 2, $v_o$ is the volume at 0° C., and $v_1$ and $v_2$ are the volumes at temperature 1 and temperature 2.) On this basis, since the reservoir for the dynamic pressure-generating liquid can be smaller, either the length of a radial bearing can be longer, or further miniaturization of the hydrodynamic bearing device can be realized.

In addition, it is preferred for the ionic liquid to have shorter molecular chains. As a result of this, the ionic liquid will have durability with respect to shear, so that degradation of the dynamic pressure-generating liquid can be prevented. Moreover, it is preferable for the oil film strength to be high, in other words for the polarity to be high, so that the adsorptive onto the shaft or shafts is strong.

In addition, along with it being more difficult for bubbles to be generated in the ionic liquid, the ionic liquid will have the property that it will be difficult for the bubbles to come to rest within the liquid once they have been generated. As a result of this property, the generation of bubbles during the assembly process can be prevented, and reliability during use can be increased. Since it is possible to obtain a device that is resistant to oscillations and impacts, it can be used in applications such as navigation systems and portable devices. Since it is also possible to prevent the generation of bubbles at reduced pressure, such devices can have increased reliability even for transport and applications in aircraft.

The ionic liquids preferably have a volume resistivity of $10^9$ Ω·cm or less, $10^8$ Ω·cm or less, $10^7$ Ω·cm or less and further $10^6$ Ω·cm or less at 20° C. The static electricity that is generated from friction between the air and the sides of the shaft or the sleeve during rotation can be the cause of an equipment malfunction. However, if the volume resistivity is ≦$10^9$ Ω·cm, the static charge generated by the rotating components passes through the ionic liquid, and flows to some extent to the fixed side of the bearing device. For this reason, it is unnecessary to employ antistatic countermeasures such as through a mechanical contact to an earth brush. It is unnecessary to provide a hydrodynamic bearing device of the present invention with components that alleviate static electricity, or to add additives.

An ionic liquid, for example N,N-diethyl-N-methyl-(2-methoxyethyl) ammonium bis-(trifluoromethanesulfonyl) imide salt, that has a low viscosity (20.5 mm²/s at 40° C.) is preferred. As a result, a highly reliable hydrodynamic bearing device with superior heat resistance as compared to the conventional case, and with little vaporization loss is obtained.

With a melting point ≦0° C., any of the following can be used: 1-butyl-3-methylimidazolium tetrafluoroborate, N,N- diethyl-N-methyl-(2-methoxyethyl)ammonium tetrafluoroborate, 1-butylpyridinium bis-(trifluoromethanesulfonyl)imide, and 1-butyl-3-methylimidazolium trifluoromethanesulfonate. Since these have low melting points, there will be no marked increases in viscosity even in a low temperature environment, and the probability of a marked increase in the torque of the shaft occurring or of the shaft locking will be low.

With a melting point ≦0° C., any of the following can be used: 1-hexyl-3-methylimidazolium bromide, 1-hexyl-3-methylimidazolium chloride, 1-hexyl-3-methylimidazolium hexafluorophosphate, 1-hexyl-3-methylimidazolium tetrafluoroborate, 1-octyl-3-methylimidazolium tetrafluoroborate, 1-octyl-3-methylimidazolium hexafluorophosphate, 1-decyl-3-methylimidazolium bromide, 1-decyl-3-methylimidazolium chloride, 1-butylpyridinium tetrafluoroborate, and 1-hexylpyridinium tetrafluoroborate. Furthermore, although these have high viscosity, they are useful by a suitably designed bearing.

1-Butyl-3-methylimidazolium hexafluorophosphate, 1-butyl-3-methylimidazolium methylsulfate, 1-butyl-3-methylimidazolium trifluoromethanesulfonate, 1-hexyl-3-methylimidazolium trifluoromethanesulfonate, and 1-hexyl-2,3-dimethylimidazolium tetrafluoroborate can also be used. Since these have melting points at about room temperature (from about 20° C. to about 23° C.), they can be used in hydrodynamic bearing devices that are designed for intended use at or above room temperature.

1-Butyl-2,3-dimethylimidazolium trifluoromethylsulfonate, 1-butyl-2,3-dimethylimidazolium bromide, 1-butyl-2,3-dimethylimidazolium chloride, 1-ethyl-2,3-dimethylimidazolium bromide, and 1-ethyl-2,3-dimethylimidazolium chloride can also be used. Since these have melting points at or above room temperature (from about 20° C. to about 23° C.), they can be used with the corresponding types of hydrodynamic bearing devices and usage conditions.

Since the physical properties such as melting point and viscosity change depending on the purity of the ionic liquids, the foregoing can be classified into groups at a given set of conditions, but while the use of these individual substances are limited, they do not serve to limit the scope of the present invention in any way.

Moreover, it is preferable for the ionic liquid to be of high purity. For example, 90% or higher purity is preferred, and 95% or higher is more preferred, while 98% or higher is still more preferred. As a consequence of this, the stability will increase, with the advantage that the above-mentioned desirable physical properties will be obtained.

Furthermore, it is satisfactory if the ionic liquid of the present invention is provided with at least one of the above properties, but it is preferable if it is provided with two or more.

In addition, additives can be combined with the dynamic pressure-generating liquids. The additives can be known compounds selected with the object of more increasing or supplementing the performance characteristics of the dynamic pressure-generating liquid. Specifically, one or two or more additives such as antioxidants, rust inhibitors, metal deactivators, oiliness improvers, extreme pressure agents, friction modifiers, anti-wear agents, pour point depressants, antifoaming agents, antistatic additives, detergent dispersants, and the like can be added to the combination. The main components of ionic liquid are polar substances and additives which are polar and comparatively more soluble will be effective. Additives can cause gas generation or a change in characteristic with degradation, so in order not to diminish the performance of the bearing, the total amount added should be kept to the minimum necessary.

Furthermore, when filling the hydrodynamic bearing device with dynamic pressure-generating liquid, it is recommended to be filtered beforehand through a filter with a pore diameter less than the dimensions of the smallest radial gap (for example, either pressurized or reduced pressure filtration), in order to remove foreign matter. If foreign matter is allowed to enter the device, there is a greater likelihood of producing the type of bearing lock up mentioned above.

The dynamic pressure-generating liquids used in hydrodynamic bearing devices of the present invention are described below in further detail.

Comparative Examples 1 and 2 incorporate phenol-type antioxidants: 0.5 wt % of 4,4'-methylenebis-2,6-di-tert-butylphenol and 0.5 wt % of tetrakis-[methylene-3-(3',5'-di-tert-butyl-4'-hydroxyphenyl)propionate]methane. No additives are used in Examples 1 through 7. The quantities of additives in the compositions of the present invention are expressed in wt %, calculated on the basis of the total amount of the base oil and the dynamic pressure-generating liquid including the additives.

Reduced pressure filtration was performed on all of the dynamic pressure-generating liquid, using a filter with a pore diameter ≦2.5 μm, in order to remove impurities.

EXAMPLE 1

1-ethyl-3-methylimidazolium tetrafluoroborate ($EMI.BF_4$) is as the dynamic pressure-generating liquid.

EXAMPLE 2

1-ethyl-3-methylimidazolium bis-(trifluoromethanesulfonyl) imide (EMI.TFSI) is as the dynamic pressure-generating liquid.

EXAMPLE 3

1-ethyl-3-methylimidazolium dicyanamide (EMI.DCA) is as the dynamic pressure-generating liquid.

EXAMPLE 4

1-hexyl-3-methylimidazolium bis-(trifluoromethanesulfonyl) imide (HEI.TFSI) is as the dynamic pressure-generating liquid.

EXAMPLE 5

N,N-Diethyl-N-methyl-(2-methoxyethyl)ammonium bis-(trifluoromethanesulfonyl)imide (DMMA.TFSI) is as the dynamic pressure-generating liquid.

EXAMPLE 6

1-Butyl-3-ethylimidazolium tetrafluoroborate ($BEI.BF_4$) is as the dynamic pressure-generating liquid.

EXAMPLE 7

1-Butylpyridinium bis-(trifluoromethanesulfonyl)imide (BP.TFSI) is as the dynamic pressure-generating liquid.

COMPARATIVE EXAMPLE 1

The diester dioctyl sebacate (DOS) is as the dynamic pressure-generating liquid.

COMPARATIVE EXAMPLE 2

The polyol ester trimethylolpropane tricaprylate (TMP+ C8 acid) is as the dynamic pressure-generating liquid.

The properties of the dynamic pressure-generating liquids are shown in Table 1.

TABLE 1

| Item | | Ex. 1 EMI-BF$_4$ | Ex. 2 EMI-TFSI | Ex. 3 EMI-DCA | Ex. 4 HEI-TFSI | Ex. 5 DMMA-TFSI |
|---|---|---|---|---|---|---|
| kinematic viscosity (mm$^2$/s) | 40° C. | 17.0 | 13.2 | 9.0 | 24.2 | 27.1 |
| pour point (° C.) | | 13 | −30 | <−40 | <−50 | −30 |
| Surface tension (mN/m) | 20° C. | 44.4 | 35.4 | 57.3 | | |
| Mean coefficient of volume expansion (1/K) | 0~80° C. | 5.3 × 10$^{-4}$ | | | | |
| Viscosity index(−) | | 213 | 198 | 270 | 176 | |

| Item | | Ex. 6 BEI-BF$_4$ | Ex. 7 BP-TFSI | Cmp. Ex. 1 DOS | Cmp. Ex. 2 TMP + C8 acid |
|---|---|---|---|---|---|
| kinematic viscosity (mm$^2$/s) | 40° C. | 43.0 | 22.4 | 12.6 | 17.3 |
| pour point (° C.) | | −20 | −20 | <−50 | −60 |
| Surface tension (mN/m) | 20° C. | | | 31.5 | 30.5 |
| Mean coefficient of volume expansion (1/K) | 0~80° C. | | | 7.7 × 10$^{-4}$ | 7.8 × 10$^{-4}$ |
| Viscosity index (−) | | 150 | 160 | 157 | 131 |

The motor consumption current was measured at 5400 rpm in a 40° C. environment, with a configuration having a spindle motor that is equipped with a hydrodynamic bearing device comprising radial gap 10 of 5.0 μm between shaft 2 and sleeve 4, shaft 2 of martensite stainless steel with a diameter of 3 mm, and sleeve 4 of a copper alloy, and filled with the specified identical amounts of the dynamic pressure-generating liquids mentioned above for Examples 5 through 7 and Comparative Examples 1 and 2. The motor consumption current values for each of the examples is shown with the motor consumption current of Comparative Example 1 at 40° C. set to 100.

With continuous rotation carried out for a maximum of 1000 hours at 120° C., the presence or absence of oscillations due to the reduction in liquid levels that accompanies evaporation of dynamic pressure-generating liquid 8 was determined. After the experiment was completed, hub 5 was removed, and a microscopic examination of the gap between the open end of sleeve 4 (upper side in FIG. 1) and shaft 2, in other words from the upper surface of the fill level for dynamic pressure-generating liquid 8, was carried out, and the liquid level was checked. When the liquid level for dynamic pressure-generating liquid 8 could not be identified, the amount of dynamic pressure-generating liquid 8 had decreased due to evaporation and the liquid level had dropped to the interior of the bearing, and the amount of dynamic pressure-generating liquid was insufficient to the requirements for sustained performance, and the Example was judged as having inadequate reliability.

Measurements of the volume resistivity in the Embodiments and the Comparative Examples were carried out using a To a DKK, Inc., SM-8213 super-insulating resistance tester and an SME-8330 dynamic pressure-generating liquid electrode from the same company, at 5 V and 20° C. The measurement results are shown in Table 2.

TABLE 2

| | Motor consumption current | Shaft wobbling (120° C.) | | Liquid level | Volume resistivity (Ω cm) |
|---|---|---|---|---|---|
| | (40° C.) | 500 hr | 1000 hr | | |
| Ex. 5 | 206 | ○ | ○ | ○ | 1 × 10$^7$ or less |
| Ex. 6 | 297 | ○ | ○ | ○ | 1 × 10$^7$ or less |
| Ex. 7 | 177 | ○ | ○ | ○ | 1 × 10$^7$ or less |
| Cmp. Ex. 1 | 100 | x (240) | x | x (240) | 2.3 × 10$^{12}$ |
| Cmp. Ex. 2 | 124 | Δ | x | x | 8.5 × 10$^{11}$ |

As is clear from Table 2, in the results for a continuous run at 120° C., shaft lock occurred in Comparative Example 1 at 240 hours after the experiment had begun. In Comparative Example 2 at 500 hours after the experiment had begun, an oscillation of from about 40 Hz to about 44 Hz that is referred to as a half-whirl was identified, due to insufficient dynamic pressure-generating liquid inside the bearing. For Comparative Example 2 at 1000 hours after the experiment had begun, an unusual sound was identified that was considered to be due to shaft friction, and the specified rpm could not be maintained. In contrast, there was no shaft lock, shaft wobbling, or unusual sound generation at any time throughout 1000 hours for Examples 5 through 7.

In the results for the microscopic observations of the liquid levels, these liquid levels were identified for Examples 5 through 7 throughout the 1000 hours, but liquid levels were not identified for Comparative Example 1 and 2.

In the results for the volume resistivity of the ionic liquids (Examples 5 through 7), precise values could not be obtained because they were below the measurement limits (1.054× 10$^7$Ω) for the abovementioned measurement devices, but the values for all of the dynamic pressure-generating liquids in Examples 5 through 7 were <1×10$^7$ Ω·cm. The dynamic pressure-generating liquids in Examples 5 through 7 can be considered to have adequate conductivity.

The motor consumption current at 40° C. was higher in Examples 5 through 7 as compared to Comparative Examples 1 and 2, but the specified rpm was achieved within 1 second, and in practical terms the Examples 5 through 7 were judged to be problem-free.

From the above, the dynamic pressure-generating liquids in the hydrodynamic bearing devices and spindle motors were confirmed to have superior heat resistance, little loss through vaporization, and adequate conductivity.

INDUSTRIAL APPLICABILITY

Hydrodynamic bearing devices, and spindle motors using hydrodynamic bearing device that relate to the present invention can find application as motors for magnetic disk devices (hard disk devices), optical disk devices, scanner devices, laser beam printers, video recorders and the like. In particular, spindle motors and magnetic disk devices equipped with small-scale magnetic disks 2.5 or fewer inches in size are effective. Furthermore, the present invention can, for example, also be applied to hydrodynamic bearing devices used in mobile devices.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A hydrodynamic bearing device, comprising at least one of a shaft structure and a sleeve having a dynamic pressure-generating mechanism, and a dynamic pressure-generating liquid present in a gap between the shaft structure and the sleeve;
   wherein the main component of the dynamic pressure-generating liquid is at least one selected from the group consisting of
   ionic liquids having viscosity index of 150 or more;
   ionic liquids having surface tension of 35 mN/m or more at 20° C.; and
   ionic liquids having mean coefficient of volume expansion between 0° C. and 80° C. of $7.0 \times 10^{-4} K^{-1}$ or less; and
   each of the ionic liquids are at least one selected from the group consisting of imidazolium salts, pyridinium salts, ammonium salts and phosphonium salts as positive ions, and at least one selected from the group consisting of halides, nitrates, sulfur containing groups, fatty acids, cyano groups and perfluoro groups as negative ions.

2. A hydrodynamic bearing device, comprising at least one of a shaft structure and a sleeve having a dynamic pressure-generating mechanism, and a dynamic pressure-generating liquid present in a gap between the shaft structure and the sleeve;
   wherein the main component of the dynamic pressure-generating liquid is at least one selected from the group consisting of
   ionic liquids having viscosity index of 150 or more,
   ionic liquids having surface tension of 35 mN/m or more at 20° C.; and
   ionic liquids having mean coefficient of volume expansion between 0° C. and 80° C. of $7.0 \times 10^{-4} K^{-1}$ or less; and
   each of the ionic liquids are at least one compound represented by

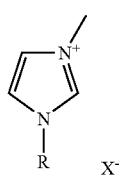
(1)

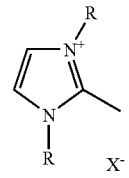
(2)

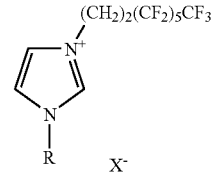
(3)

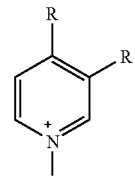
(4)

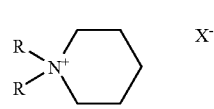
(5)

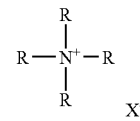
(6)

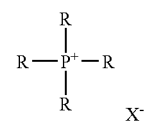
(7)

wherein, R represents a hydrogen atom or any C1-C14 alkyl, and when there is more than one R in the molecular formula, each R has an identical structure, or the structures of some or all R are different, and wherein X is at least one selected from the group consisting of inorganic ions and organic ions.

3. The device as recited in claim 2, wherein R is a C1-C14 alkyl, said C1-C14 alkyl being one of methyl, ethyl, propyl, iso-butyl, n-butyl, pentyl, tetradecyl alkyls, wherein said one inorganic ions is at least one of Cl, Br, $BF_4$, $PF_6$, $NO_3$ and halide, and wherein said organic ions is at least one of HSCN, $CF_3SO_3$, $CF_3(CF2)_3SO_3$, $CF_3(CF_2)_7SO_3$, $(CF_3SO_2)_2N$, $(C_2F_5SO_2)_2N$, p-$CH_3C_6H_4SO_2$, $CH_3SO_3$, $C_8H_{17}OSO_3$, $CH_3OSO_3$, $CH_3O(C_2H_4O)_2SO_3$, $[(CH_3)_3CCH_2CH(CH_3)CH_2]_2P(O)O$, $CH_3(CH_2)_8CO_2$, $N(CN)_2$).

* * * * *